US008782790B1

(12) United States Patent
Smith et al.

(10) Patent No.: US 8,782,790 B1
(45) Date of Patent: Jul. 15, 2014

(54) SIGNATURE CREATION FOR MALICIOUS NETWORK TRAFFIC

(75) Inventors: Spencer Smith, El Segundo, CA (US); Adam Glick, Culver City, CA (US); Nicholas Graf, Culver City, CA (US); Uriel Mann, Oak Park, CA (US)

(73) Assignee: Symantec Corporation, Mountain View, CA (US)

( * ) Notice: Subject to any disclaimer, the term of this patent is extended or adjusted under 35 U.S.C. 154(b) by 143 days.

(21) Appl. No.: 12/709,432

(22) Filed: Feb. 19, 2010

(51) Int. Cl.
H04L 29/06 (2006.01)

(52) U.S. Cl.
CPC ........ *H04L 63/1441* (2013.01); *H04L 63/1416* (2013.01)
USPC .......................................................... 726/24

(58) Field of Classification Search
None
See application file for complete search history.

(56) References Cited

U.S. PATENT DOCUMENTS

| 7,310,815 | B2 * | 12/2007 | Yanovsky ........................ 726/13 |
| 7,540,025 | B2 * | 5/2009 | Tzadikario ........................ 726/22 |
| 7,600,257 | B2 * | 10/2009 | Dubrovsky et al. .............. 726/23 |
| 7,694,150 | B1 * | 4/2010 | Kirby ............................. 713/188 |
| 7,738,380 | B1 * | 6/2010 | Dubrovsky et al. ........... 370/235 |
| 7,835,361 | B1 * | 11/2010 | Dubrovsky et al. ........... 370/394 |
| 8,201,244 | B2 * | 6/2012 | Sun et al. ......................... 726/22 |
| 8,266,698 | B1 * | 9/2012 | Seshardi et al. ................ 726/24 |
| 8,549,647 | B1 * | 10/2013 | Mason et al. .................... 726/24 |
| 2003/0188189 | A1 * | 10/2003 | Desai et al. .................... 713/201 |
| 2004/0123141 | A1 * | 6/2004 | Yadav ............................ 713/201 |
| 2006/0026669 | A1 * | 2/2006 | Zakas ................................. 726/6 |
| 2006/0253908 | A1 * | 11/2006 | Yang ............................... 726/24 |
| 2007/0256127 | A1 * | 11/2007 | Kraemer et al. ................ 726/23 |
| 2008/0127336 | A1 * | 5/2008 | Sun et al. ......................... 726/22 |
| 2008/0201779 | A1 | 8/2008 | Tahan et al. |
| 2008/0229415 | A1 * | 9/2008 | Kapoor et al. .................. 726/22 |
| 2009/0044024 | A1 * | 2/2009 | Oberheide et al. ............ 713/188 |
| 2009/0070459 | A1 * | 3/2009 | Cho et al. ....................... 709/224 |
| 2010/0192223 | A1 * | 7/2010 | Ismael et al. .................... 726/22 |
| 2010/0296496 | A1 * | 11/2010 | Sinha et al. .................... 370/338 |

OTHER PUBLICATIONS

Sarang Dharmapurikar et al., Deep Packet Inspection using Parallel Bloom Filters, Aug. 20-22, 2003, IEEE, Proceedings of the 11th Symposium on High Performance Interconnects, 44-51.*
James Newsome, Dynamic Taint Analysis for Automatic Detection, Analysis, and Signature Generation of Exploits on Commodity Software, May 2004, pp. 1-36.*
Hyang-Ah Kim, "Autograph: Toward Automated, Distributed Worm Signature Detection", 2004, pp. 1-16.*

(Continued)

*Primary Examiner* — Benjamin Lanier
(74) *Attorney, Agent, or Firm* — Fenwick & West LLP

(57) ABSTRACT

An endpoint on a network uses detection data to detect a malicious software attack. The endpoint identifies content associated with the attack, such as a component of a web page, and generates a description of the content. The endpoint sends the description to a security server. The security server analyzes the content and identifies characteristics of the content that are present when the content is carried by network traffic. The security server generates a traffic signature that specifies the identified characteristics and provides the traffic signature to inspection points. The inspection points, in turn, use the traffic signature to examine network traffic passing through the inspection points to detect network traffic carrying the content. The attack detection at the endpoint thus informs the traffic signature-based detection at the inspection points and reduces the spread of malicious software.

19 Claims, 6 Drawing Sheets

(56) References Cited

OTHER PUBLICATIONS

Griffin, K. et al., "Automatic Generation of String Signatures for Malware Detection," Lecture Notes in Computer Science, 2009, vol. 5758/2009, 101-120, DOI: 10.1007/978-3-642-04342-0_6.

Mandl, T. et al., "ANUBIS: Analyzing Unknown BInarieS The Automatic Way," Sep. 25, 2009, Virus Bulletin Conference 2009, Geneva, 32 pages.

* cited by examiner

SIGNATURE CREATION FOR MALICIOUS NETWORK TRAFFIC

BACKGROUND OF THE INVENTION

1. Field of the Invention

This invention pertains in general to computer security and in particular to detecting malicious software.

2. Description of the Related Art

There is a wide variety of malicious software (malware) that can attack modern computers. Malware threats include computer viruses, worms, Trojan horse programs, spyware, adware, crimeware, and phishing websites. Malware can, for example, surreptitiously capture important information such as logins, passwords, bank account identifiers, and credit card numbers. Similarly, the malware can provide hidden interfaces that allow the attacker to access and control the compromised computer.

Modern malware is often targeted and delivered to only a relative handful of computers. For example, a Trojan horse program can be designed to target computers in a particular department of a particular enterprise. Such malware is difficult for security software to detect because there are fewer instances of the same malware, and the security software might not be configured to recognize it. Moreover, even mass-distributed malware is becoming harder to detect because the malware can contain polymorphisms designed to evade detection.

In response to the increasing difficulty of detecting malware, security software is evolving toward heuristics-based detection. This type of detection uses a set of heuristics, such as descriptions of behaviors that are indicative of malicious behavior, to identify malware. Heuristic-based detection can work well, but has drawbacks in some environments. For example, behavior-based heuristics require that the potential malware be allowed to execute in order to exhibit the behaviors that are then flagged as malicious. This requirement renders heuristic-based detection unsuitable for environments where the malware does not execute, such as in routers, firewalls, and other computers that are using network traffic filtering to scan for malware "on-the-wire." Moreover, heuristic-based detection capabilities are not present in all environments where malware may execute, meaning that computers in these environments are still susceptible to attack.

BRIEF SUMMARY

The above and other issues are addressed by a computer-implemented method, computer system, and computer-readable medium for creating a traffic signature for detecting content in network traffic. An embodiment of the method comprises receiving a description of content associated with an attack on an endpoint of a computer network. The method further comprises generating a traffic signature for the described content, where the traffic signature identifies characteristics of the content that are present when the content is carried by network traffic. The method additionally comprises providing the traffic signature to an inspection point. The inspection point is adapted to use the traffic signature to examine network traffic passing through the inspection point to detect network traffic carrying the content.

Embodiments of the computer system comprise a non-transitory computer-readable storage medium storing executable computer program modules. The modules comprise a content collection module for receiving a description of content associated with an attack on an endpoint of a computer network. The modules also comprise a signature creation module for creating a traffic signature for the described content, the traffic signature identifying characteristics of the content that are present when the content is carried by network traffic. The modules further comprise a signature distribution module for providing the traffic signature to an inspection point. The inspection point is adapted to use the traffic signature to examine network traffic passing through the inspection point to detect network traffic carrying the content. The computer system further comprises a computer processor for executing the computer program modules.

Embodiments of the computer-readable medium store executable computer program modules for enabling creation of a traffic signature for detecting content in network traffic. The modules comprise a monitoring module for monitoring activity of an application at an endpoint. The modules additionally comprise an attack detection module for detecting an attack on the application by analyzing activities monitored by the monitoring module. The modules further comprise a content identification module for identifying content associated with the detected attack and for generating a description of the identified content, and a communications module for providing the content description to a security server via a network. The security server is adapted to receive the content description and generate a traffic signature for the described content, the traffic signature identifying characteristics of the content that are present when the content is carried by network traffic and to provide the traffic signature to an inspection point. The inspection point is adapted to use the traffic signature to examine network traffic passing through the inspection point to detect network traffic carrying the content.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
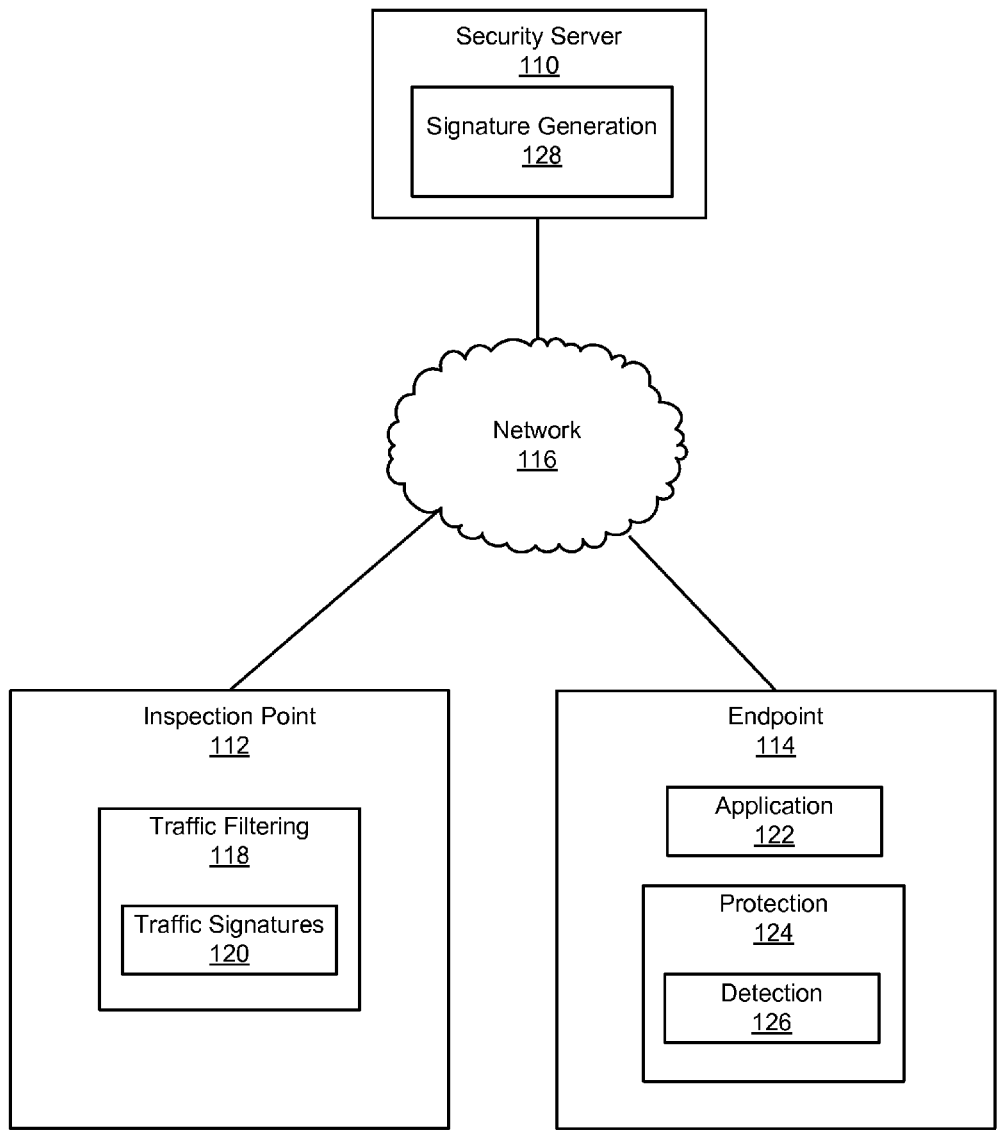
FIG. 1 is a high-level block diagram of a computing environment according to one embodiment.

FIG. 1 is a high-level block diagram of a computing environment 100 according to one embodiment. FIG. 1 illustrates a security server 110, an inspection point 112, and an endpoint 114 connected by a network 116. Only one inspection point 112 and one endpoint 114 are illustrated in FIG. 1 in order to simplify and clarify the description. Embodiments of the computing environment 100 can have thousands or millions of inspection points 112 and endpoints 114. Some embodiments also have multiple security servers 110.

The network 116 represents the communication pathways between the security server 110, inspection points 112, endpoints 114, and other entities on the network. In one embodiment, the network 116 is the Internet and uses standard communications technologies and/or protocols. Thus, the network 116 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

An inspection point 112 inspects network traffic passing through the inspection point for content containing malicious software ("malware"). The inspection point 112 is often located at an intermediate location between the source and destination of the traffic. For example, the inspection point 112 can be located at an Internet Service Provider ("ISP"), at the gateway between an enterprise network and a public network such as the Internet, or at other locations with access to network traffic destined for multiple locations. In such embodiments, the inspection point 112 can reside in a network interface card, router, firewall, or other similar device. The inspection point 112 can also reside at the ultimate source and/or destination of the network traffic (e.g., in a network software stack executing on an endpoint 114). The inspection point 112 can be formed of hardware and/or software elements.

The content for which the inspection point 112 inspects can include any text or binary stream of bytes which an application 122 at an endpoint 114 might use in a way that allows a security vulnerability at the endpoint to be exploited. The content includes data that are executable or loadable at the endpoint 114, such as files in the Portable Executable (.EXE) or dynamic link library (.DLL) formats, data that are rendered at the endpoint (e.g., data in the HTML, XML, Portable Document Format (PDF), or ADOBE FLASH formats), data that are interpreted as instructions at the endpoint (e.g., JAVASCRIPT and VBSCRIPT), and other data that can be downloaded or installed by the endpoint 114.

The inspection point 112 uses traffic filtering to detect malware residing within the network traffic. To this end, the inspection point 112 includes a traffic filtering module 118 having a set of traffic signatures 120. The traffic signatures 120 identify data strings/or and other characteristics of malware in a manner that allows content containing the malware to be detected in the network traffic. The traffic filtering module 118 scans the network traffic to identify traffic matching signatures from the set 120. For example, the traffic filtering module 118 can perform inspection at layers 2 and 3 of the Open System Interconnection (OSI) model (so called "deep-packet inspection") to identify packets having content matching the characteristics specified by the traffic signatures 120. If network traffic matches a traffic signature, the filtering module 118 performs an action that remediates the detected malware, such as blocking, redirecting, marking, and/or reporting the traffic. The filtering module 118 can also add metadata to the network traffic containing the content, such as metadata indicating the IP address, port, protocol, and/or URL associated with the content. In one embodiment, the traffic filtering module receives the traffic signatures 120 from the security server 110.

An endpoint 114 is a destination of traffic traversing the network 116. In one embodiment, an endpoint 114 is a computer used by one or more users to perform activities including browsing web sites on the network 116 and downloading, installing, updating, and/or executing applications. The endpoint 114 can also be a network-capable device not traditionally thought of as a computer, such as a mobile telephone, personal digital assistant (PDA), video game system, television "set-top box," or any other device that encounters network traffic.

FIG. 1 illustrates that the endpoint 114 includes an application 122 and a protection module 124. The application 122 includes one or more processes executing on the endpoint 114 that communicate with an entity on the network 116 to bring content onto the endpoint. The application 122 may perform an action using the content that allows malware in the content to exploit a security vulnerability of the application and compromise the endpoint 114. The application 122 can be a web browser such as MICROSOFT INTERNET EXPLORER or MOZILLA FIREFOX, for example, that allows the user to retrieve, render, and execute content from web servers and other computers on the network 116. The protection module 124 monitors the operation of the application 122 to protect the application, and endpoint 114, from malware. Depending upon the embodiment, the protection module 124 can be located within an operating system executing on the endpoint 114, a standalone security product, or integrated into the application 122 as a plug-in or browser helper object (BHO).

In one embodiment, the protection module 124 includes detection data 126 that describe ways to detect malware attacks at the endpoint 114. In one embodiment, the protection module 124 receives the detection data 126 from the security server 110. The detection data 126 can specify a variety of ways to detect malware, such as behaviors, reputations, and signatures. For example, the detection data 126 can describe abnormal behaviors performed by the application 122 that indicate a vulnerability of the application is being exploited by previously-unknown malware.

When the protection module 124 detects a malware attack at the endpoint 114, it identifies the content associated with the attack, i.e., the content in which the attacking malware resides. For example, the protection module 124 can detect that a script caused abnormal behavior in the application 122 when the application rendered the web page containing the script. In this case, the protection module 124 identifies the script as the content containing the malware. The protection module 124 generates a description of the detected content and sends the description to the security server 110.

The inspection point 112 and endpoint 114 are located within the same entity in some embodiments. For example, a home computer can include both a traffic filtering module 118 for filtering network traffic entering the computer and a protection module 124 for monitoring the operation of an application 122 executing on the computer. In addition, the traffic filtering module 118 can be located at a home computer that lacks a protection module 124. Thus, some entities are both endpoints 114 and inspection points 112.

The security server 110 collects descriptions of content containing malware detected by protection modules 124 of endpoints 114 on the network 110. A signature generation module 128 at the security server 110 analyzes the descriptions of a given piece of content to identify characteristics of the content that are present in network traffic carrying the content. The signature generation module 128 uses the characteristics to generate a traffic signature for the content. The security server 110 distributes the generated traffic signature to the traffic filtering modules 118 of the inspection points 112, and the inspection points use the traffic signature to detect the content containing the malware.

In the technique described above, malware detections made by the endpoints 114 are leveraged to generate traffic signatures. These traffic signatures, in turn, are used to detect malware in network traffic filtered by the inspection points 112. The detections at the inspection points 112 stop malware infections before the malware reaches the endpoints 114. Further, in the case where the inspection point 112 and endpoint 114 are located within the same entity, the inspection point 112-based detection stops the malware before it reaches the application it is intending to attack. Moreover, since the network traffic filtered through the inspection points 112 may be destined for endpoints 114 that lack malware protection, generating and using traffic signatures in this manner provides protection to otherwise unprotected endpoints. Detection at the inspection points 112 also tends to generate fewer false positives than detections at the endpoints 114, and tends to be more reliable because it is more difficult for the malware to evade detection while being carried in network traffic. Additionally, stopping malware at the inspection points 112 reduces any "collateral damage" to the endpoint 114 that may occur if the malware successfully attacks the endpoint prior to being detected by the protection module 124. In sum, the malware detection at the endpoints 114 informs and improves the detection at the inspection points 112 and ultimately reduces the spread of malware.

Depending on the embodiment, one or more of the functions of the security server 110 can be provided by a cloud computing environment. As used herein, cloud computing refers to a style of computing in which dynamically scalable and often virtualized resources are provided as a service over the network 116. Functions of the inspection points 112 and endpoints 114 can also be provided by the cloud computing environment.

Figure 2:
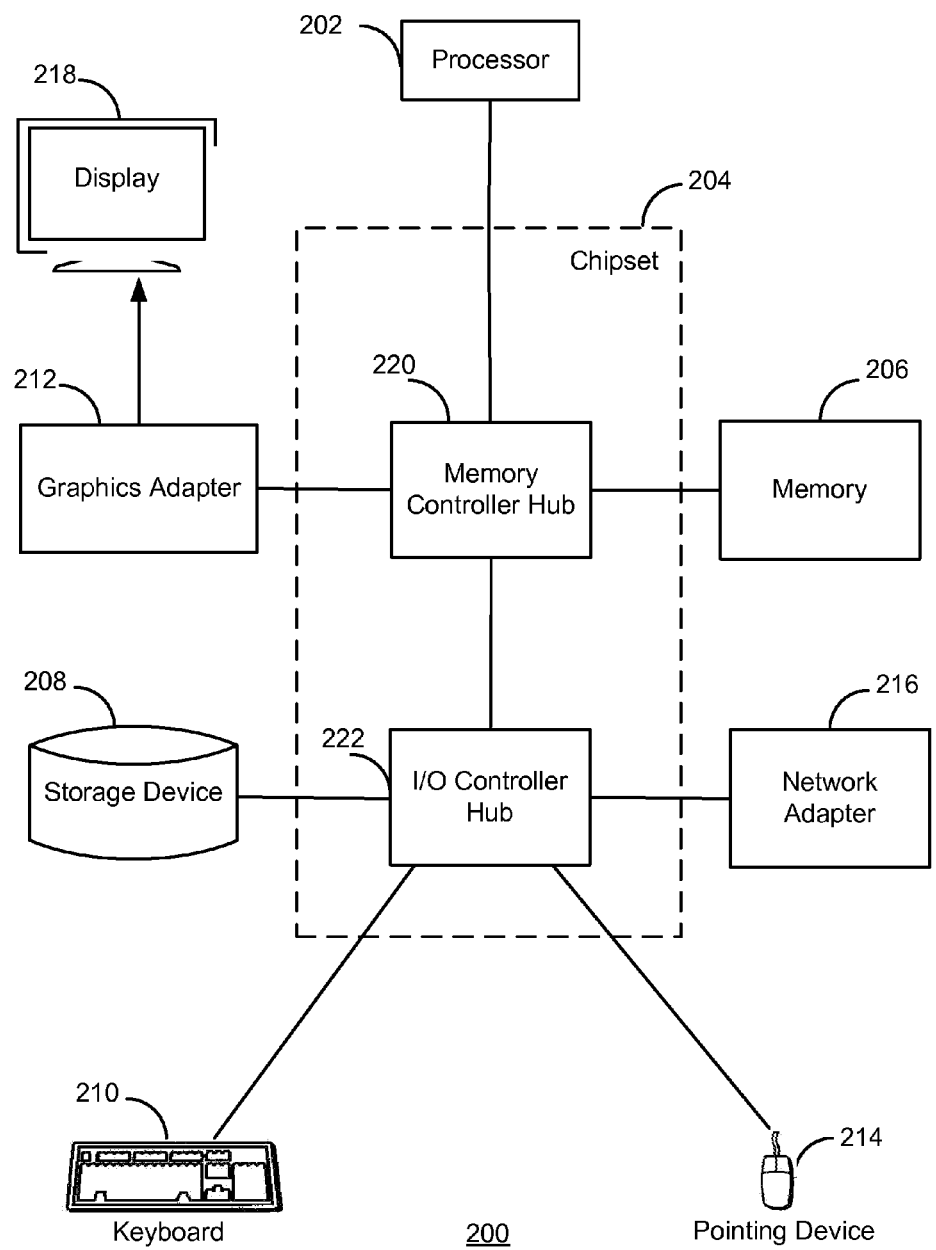
FIG. 2 is a high-level block diagram illustrating a typical computer for use as a security server, inspection point, or endpoint according to one embodiment.

FIG. 2 is a high-level block diagram illustrating a typical computer 200 for use as a security server 110, inspection point 112, or endpoint 114. Illustrated are a processor 202 coupled to a chipset 204. Also coupled to the chipset 204 are a memory 206, the storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to the network 116.

As is known in the art, a computer 200 can have different and/or other components than those shown in FIG. 2. In addition, the computer 200 can lack certain illustrated components. In one embodiment, a computer 200 acting as a security server 110 lacks a keyboard 210, pointing device 214, graphics adapter 212, and/or display 218. Moreover, the storage device 208 can be local and/or remote from the computer 200 (such as embodied within a storage area network (SAN)).

This description uses the term "module" to refer to computer program logic for providing a specified functionality. A module can be implemented in hardware, firmware, and/or software. A module is typically stored on a computer-readable storage medium such as the storage device 208, loaded into the memory 206, and executed by the processor 202.

Figure 3:
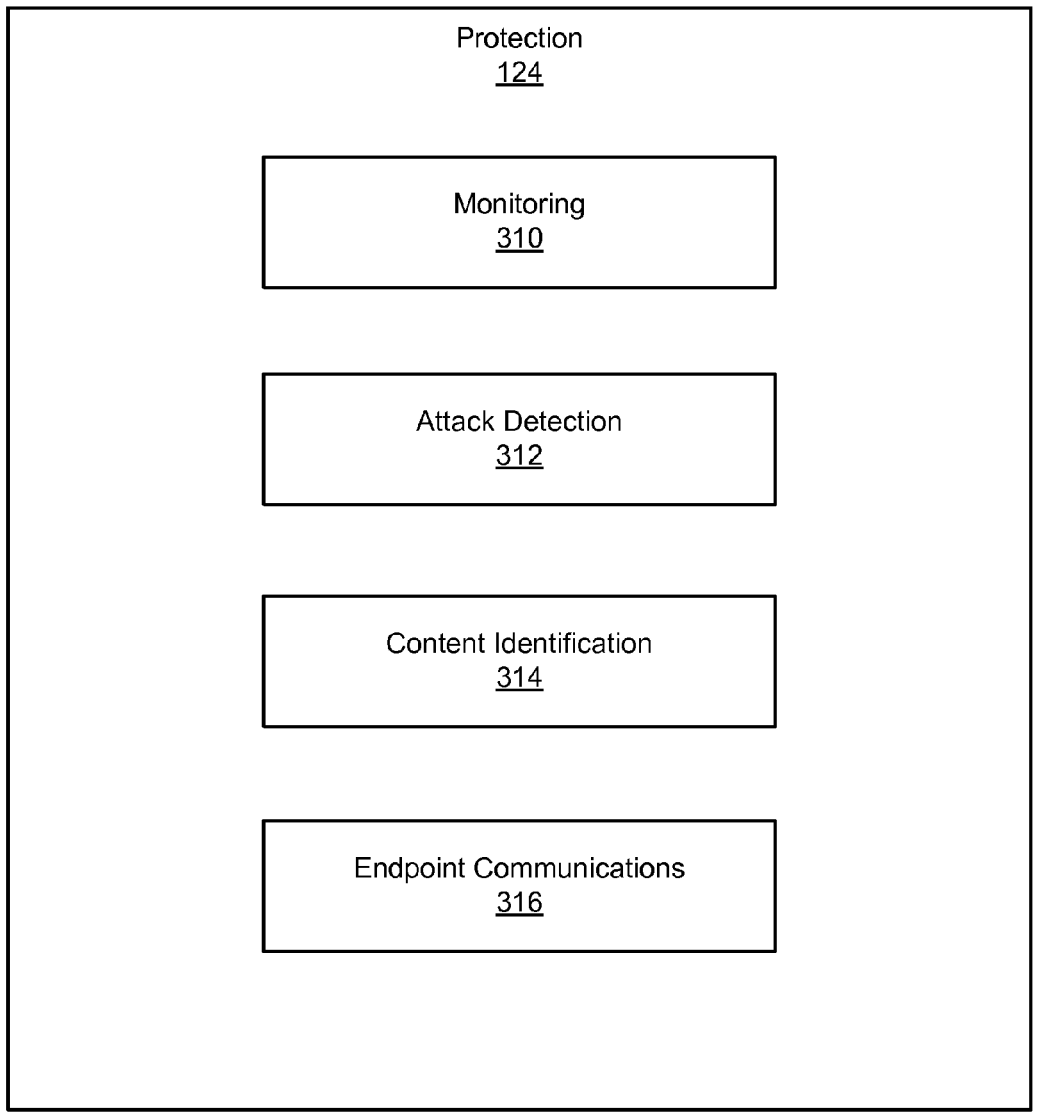
FIG. 3 is a high-level block diagram illustrating a detailed view of the protection module of an endpoint according to one embodiment.

FIG. 3 is a high-level block diagram illustrating a detailed view of the protection module 124 of an endpoint 114 according to one embodiment. As shown in FIG. 3, the protection module 124 itself includes multiple modules. In some embodiments, the functions are distributed among these modules in a different manner than described herein.

A monitoring module 310 monitors activity by the application 122 and/or elsewhere at the endpoint 114. For example, if the application is a web browser, the monitoring module 310 observes content processed by the application 122 as it renders web pages. The content can include, for example, HTML documents, images, JAVASCRIPT and other types of scripts, ActiveX controls, ADOBE FLASH content, and other executable and non-executable content. In addition, the monitoring module 310 observes behaviors of the application 122 as it processes the content. The behaviors include downloading web pages and other content served by web sites on the network 116, accessing content and other resources stored at the endpoint 114, spawning processes at the endpoint 114, and the like.

An attack detection module 312 analyzes the activities monitored by the monitoring module 310 to detect when the application 122 (or another entity on the endpoint 114) is attacked by malware. As mentioned above, one embodiment of the attack detection module 312 uses detection data 126 to recognize a malware attack. The attack detection module 312 analyzes the activities in view of the detection data, and detects an attack if warranted. The attack detection module 312 can perform one or more actions to remediate the attack, such as blocking malicious behavior, quarantining malicious content, and reporting the attack to a user of the endpoint 114.

The detection data 126 can specify a variety of ways to detect malware. In one embodiment, the detection data 126 include a set of heuristics specifying behaviors by the application 122 that are characteristic of a malware attack. These behaviors can include the application 122 crashing, performing an illegal access of local resources, having memory corruption, suffering a memory buffer overflow, or downloading files that have not been requested or authorized by a user. The abnormal behaviors can also include the application 122 executing child processes or calling to the Application Programming Interface (API) of the operating system to start or stop other processes on the system.

The detection data 126 can also include information supporting reputation-based malware detection by the protection module 124. For example, the detection data 126 can indicate reputations of content downloaded by the application 122. Content having a low reputation can be convicted as malware based on the reputation alone, or on a combination of the low reputation and other features, such as causing the application 122 to perform potentially-malicious behaviors. The detection data 126 can also include signatures for detecting malware when the malware is in the format used by the application 122.

A content identification module 314 identifies content associated with a detected malware attack. In general, the type of content associated with the attack depends upon the type of attack. In a typical scenario where the application 122 is attacked while rendering a web page, the associated content can include the web page being rendered when the attack occurred and/or a component of the web page, such as a script on the page. The associated content can also include content downloaded during the attack, such as an executable file downloaded during a drive-by download attack.

In one embodiment, the content identification module 314 generates a description of the identified content. The content description can include, for example, a hash produced by applying a hashing algorithm such as a variant of the Secure Hash Algorithm (SHA) to the content. Similarly, the content description can include a fingerprint of the content produced by extracting characteristic components of the content. In addition, the description of the content can include an optionally-compressed copy of the content itself. In one embodiment, the content description also includes metadata about the content, such as the address of the web page being rendered when the malware attack was detected, an identifier of the specific detection data that identified the attack, and/or other information. Different embodiments of the content identification module 314 use different techniques to generate the content description.

An endpoint communications module 316 provides a communications link between the endpoint 114 and the security server 110. In one embodiment, the endpoint communications module 316 provides the content description generated by the content identification module 314 to the security server 110. The endpoint communications module 316 also receives detection data 126 and other information supplied by the security server 110.

Figure 4:
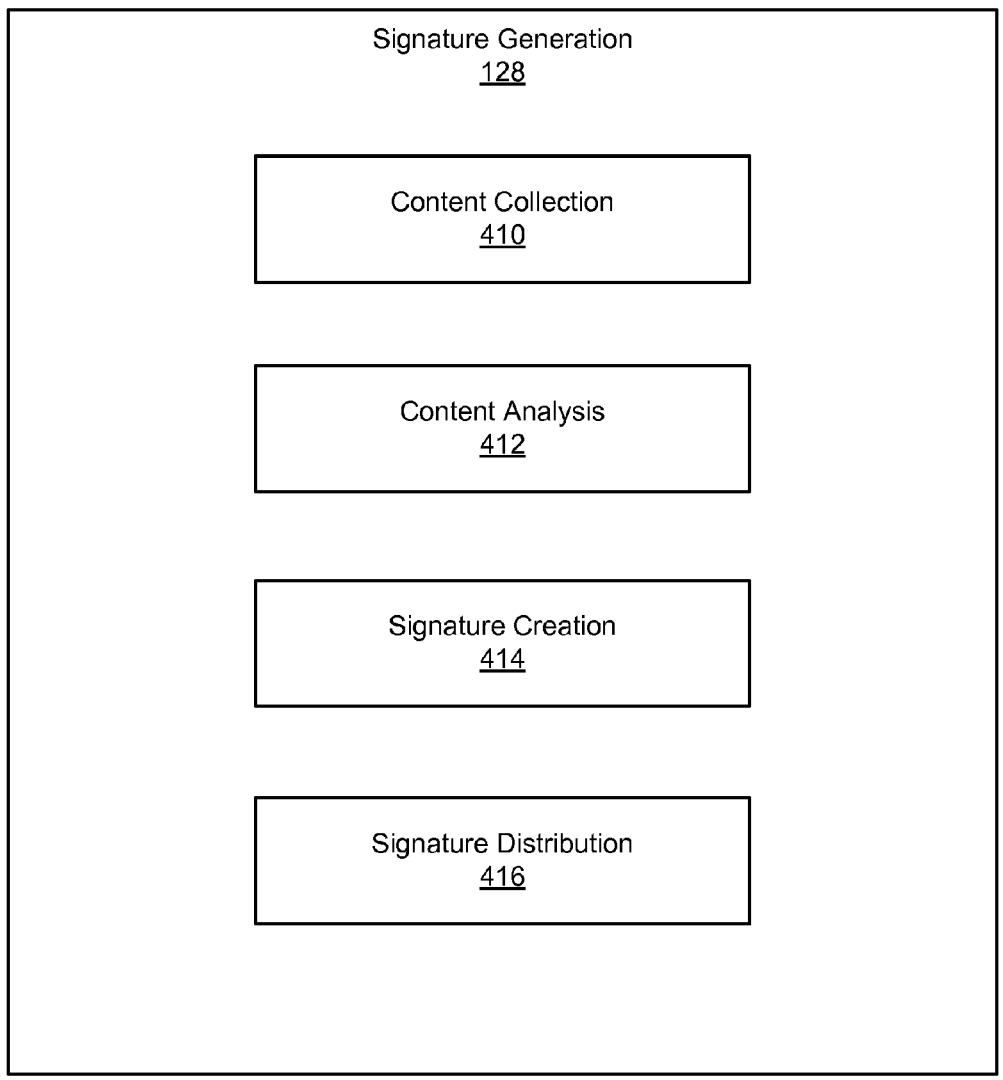
FIG. 4 is a high-level block diagram illustrating a detailed view of the signature generation module of the security server according to one embodiment.

FIG. 4 is a high-level block diagram illustrating a detailed view of the signature generation module 128 of the security server 110 according to one embodiment. As shown in FIG. 4, the signature generation module 128 itself includes multiple modules. In some embodiments, the functions are distributed among these modules in a different manner than described herein.

A content collection module 410 collects content descriptions from endpoints 114 on the network 116. As mentioned above, there can be thousands or millions of endpoints 114 on the network 116. During typical operation, a subset of the endpoints 114 will detect malware attacks as the endpoints are used by their users and send descriptions of the content associated with the attacks to the security server 110. The content collection module 410 receives and stores these content descriptions.

A content analysis module 412 analyzes the content descriptions received by the security server 110. In one embodiment, the analysis verifies that the content descriptions describe actual malware. To this end, the analysis can include correlating the content descriptions received from the endpoints 114 to identify descriptions referring to the same content. In addition, the analysis can include determining whether the content truly contains malware and is not merely generated in response to false positive attack detections at the endpoints 114.

A signature creation module 414 generates traffic signatures for detecting content in network traffic that the content analysis module 412 determines to contain malware. To generate a traffic signature for particular content, the signature creation module 414 identifies characteristics of the content that are present when the content is travelling "on-the-wire," i.e., present in traffic carrying the content on the network 116. For example, the signature creation module 414 can find a string of bytes that distinctly identifies the content and can be detected in IP packets carrying the content on the network 116. The format of the content carried in the network traffic is often different than the format of the content when it is used by applications 122 at the endpoint 114. For example, the content in the network traffic may be encrypted, compressed, base 64 encoded, etc. This format difference prevents use of signatures in the detection data 126 at the endpoint 114 for detecting malicious content in network traffic.

The signature creation module 414 forms a traffic signature that specifies the identified characteristics and enables detection of the content in network traffic. In one embodiment, the signature creation module 414 creates and tests a set of potential signatures for detecting particular content in order to exclude signatures that generate false positive detections in legitimate network traffic. Depending upon the embodiments, the functions of the content analysis 412 and signature creation 414 modules can be performed using manual and/or automated techniques.

A signature distribution module 416 provides the created traffic signatures to the inspection points 112. In one embodiment, the traffic signatures are provided on a rolling basis as new signatures are created. In another embodiment, the traffic signatures are provided on a predetermined schedule and/or upon request by an inspection point 112.

Figure 5:
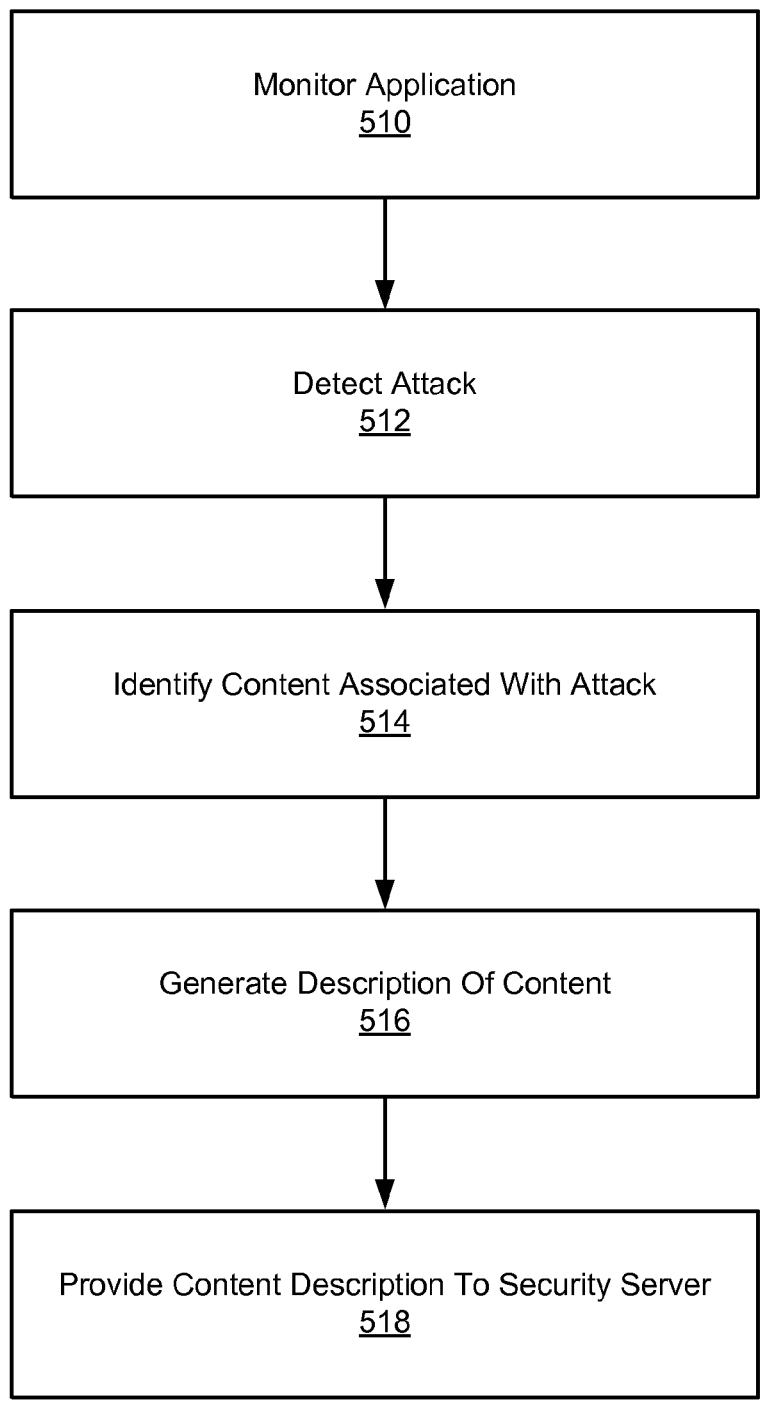
FIG. 5 is a flow chart illustrating steps performed by one embodiment of the protection module to provide a content description to the security server.

FIG. 5 is a flow chart illustrating steps performed by one embodiment of the protection module 124 to provide a content description to the security server 110. Other embodiments can perform different and/or additional steps. Moreover, other embodiments can perform the steps in different orders. Further, some or all of the steps can be performed by entities other than the protection module 124.

The protection module 124 monitors 510 activity by the application 122 and/or elsewhere at the endpoint 114. For example, the protection module 124 can monitor actions performed by the application 122 while rendering a web page downloaded from a web site via the network 116. The protection module 124 detects 512 a malware attack occurring at the endpoint 114. The attack can be detected by using detection data 126 to identify abnormal behaviors by the application 122 that signify that the application is being attacked or by other techniques. Once an attack is detected, the protection module 124 identifies 514 content, such as a component of a web page, that is associated with the attack. The protection module 124 generates 516 a description of the identified content and provides 518 the description to the security server 110.

Figure 6:
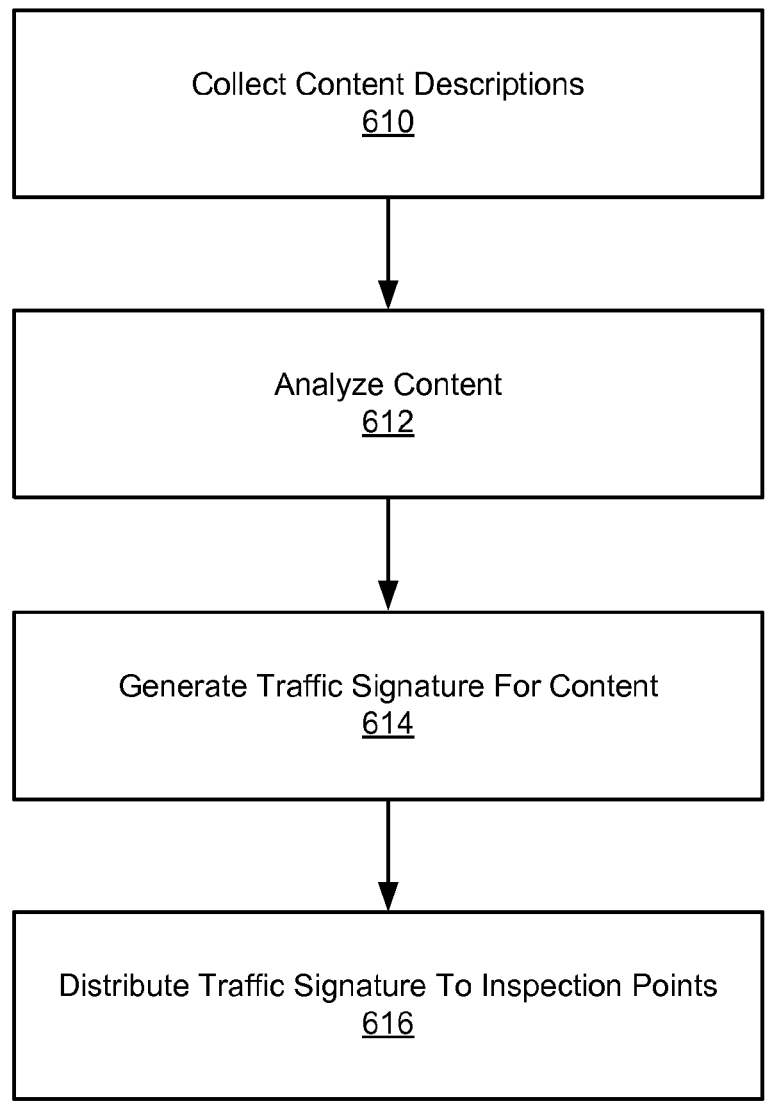
FIG. 6 is a flow chart illustrating steps performed by the security server to distribute traffic signatures to inspection points according to one embodiment.

FIG. 6 is a flow chart illustrating steps performed by the security server 110 to distribute traffic signatures to inspection points 112 according to one embodiment. Other embodiments can perform different and/or additional steps, or perform the steps in different orders. Further, some or all of the steps can be performed by entities other than the security server 110.

The security server 110 collects 610 content descriptions from endpoints 114 on the network 116. The security server 110 analyzes 612 the content descriptions to correlate the content descriptions received from the various endpoints 114 and/or perform other tasks such as verifying that described content contains malware. If content identified by a content description contains malware, the security server 110 generates 614 a traffic signature specifying characteristics that allow the content to be detected in network traffic. The secu-

The invention claimed is:

1. A computer-implemented method of creating a traffic signature for detecting content in network traffic, comprising:
   distributing detection data comprising behavior-based heuristics to a plurality of endpoints via a computer network, the behavior-based heuristics specifying one or more behaviors of an application processing content while executing on an endpoint that is characteristic of a malware attack;
   receiving, from at least some of the plurality of endpoints of the computer network, descriptions of content associated with an attack detected by the endpoints using the behavior-based heuristics of the distributed detection data;
   generating a traffic signature for the described content associated with the attack detected by at least some of the plurality of the endpoints of the computer network by correlating the received descriptions of content associated with the attack, the correlating comprising identifying and analyzing descriptions referring to same content associated with the attack received from different endpoints, the traffic signature identifying characteristics of the content that are present when the content is carried by network traffic; and
   providing the traffic signature to an inspection point, the inspection point adapted to use the traffic signature to examine network traffic passing through the inspection point to detect the described content carried by the network traffic.

2. The method of claim 1, wherein a description of the content associated with the attack detected by an endpoint of the computer network comprises one or more of: a hash of the content, a fingerprint of the content, and a copy of the content.

3. The method of claim 1, wherein the traffic signature specifies a string of bytes that identifies the content and can be detected in network traffic carrying the content.

4. The method of claim 1, wherein the content associated with the attack comprises malicious software that attempted to exploit a security vulnerability in the application at the endpoint.

5. The method of claim 1, wherein the inspection point is adapted to inspect Internet Protocol (IP) packets passing through the inspection point to detect packets having the content matching the characteristics identified by the traffic signature.

6. A computer system for creating a traffic signature for detecting content in network traffic, comprising:
   a non-transitory computer-readable storage medium storing executable computer program modules comprising:
      a communications module for distributing detection data comprising behavior-based heuristics to a plurality of endpoints via a computer network, the behavior-based heuristics specifying one or more behaviors of an application processing content while executing on an endpoint that is characteristic of a malware attack;
      a content collection module for receiving, from at least some of the plurality of endpoints of the computer network, descriptions of content associated with an attack detected by the plurality of the endpoints, an attack detected by an endpoint of the plurality of the endpoints using the behavior-based heuristics of the distributed detection data;
      a signature creation module for generating a traffic signature for the described content associated with the attack detected by at least some of the plurality of the endpoints of the computer network by correlating the received descriptions of content associated with the attack, the correlating comprising identifying and analyzing descriptions referring to same content associated with the attack received from different endpoints, the traffic signature identifying characteristics of the content that are present when the content is carried by network traffic; and
      a signature distribution module for providing the traffic signature to an inspection point, the inspection point adapted to use the traffic signature to examine network traffic passing through the inspection point to detect the described content carried by the network traffic; and
   a computer processor for executing the computer program modules.

7. The computer system of claim 6, wherein a description of the content associated with the attack detected by an endpoint of the computer network received by the content collection module comprises of one or more of: a hash of the content, a fingerprint of the content, and a copy of the content.

8. The computer system of claim 6, wherein the traffic signature specifies a string of bytes that identifies the content and can be detected in network traffic carrying the content.

9. The computer system of claim 6, wherein the content associated with the attack comprises malicious software that attempted to exploit a security vulnerability in the application at the endpoint.

10. The computer system of claim 6, wherein the inspection point is adapted to inspect Internet Protocol (IP) packets passing through the inspection point to detect the content matching the characteristics identified by the traffic signature.

11. A non-transitory computer-readable storage medium storing executable computer program modules for enabling creation of a traffic signature for detecting content in network traffic, the modules comprising:
   a communication module for receiving detection data comprising behavior-based heuristics distributed by a computer server, the behavior-based heuristics specifying one or more behaviors of an application processing content while executing on an endpoint that is characteristic of a malware attack;
   a monitoring module for monitoring activity of an application at the endpoint;
   an attack detection module for detecting an attack on the application by analyzing activities monitored by the monitoring module, wherein the attack detection module uses the behavior-based heuristics of the distributed detection data;
   a content identification module for identifying the content associated with the detected attack and for generating a description of the identified content; and
   the communications module for providing the content description to a security server via a computer network;

wherein the security server is adapted to receive, from a plurality of endpoints of the computer network, descriptions of content associated with attacks detected by the endpoints, and generate a traffic signature for the described content associated with the attack detected by the endpoints by correlating the received descriptions of content associated with the attack, the correlating comprising identifying and analyzing descriptions referring to same content associated with the attack received from different endpoints, the traffic signature identifying characteristics of the content that are present when the content is carried by network traffic, and to provide the traffic signature to an inspection point, the inspection point adapted to use the traffic signature to examine network traffic passing through the inspection point to detect the described content carried by the network traffic.

12. The computer-readable medium of claim 11, wherein the identified content comprises content processed by the application as the application renders a web page.

13. The computer-readable medium of claim 11, wherein the description of the identified content comprises at least one of: a hash of the content, a fingerprint of the content, and a copy of the content.

14. The computer-readable medium of claim 13, wherein the description of the identified content further comprises at least one of: an address of a web page being rendered when the attack was detected and an identifier of a heuristic that identified the attack.

15. The computer-readable medium of claim 11, wherein the attack detection module is further for remediating the malware attack.

16. The method of claim 1, wherein the behavior-based heuristics describe one or more behaviors of the application selected from the set consisting of:

the application crashing;

the application performing an illegal access of local resources; and the application having memory corruption.

17. The method of claim 1, generating the traffic signature further comprises:

determining whether the descriptions of the content were generated in response to false positive malware attacks detected by the endpoints.

18. The method of claim 1, wherein the detection data comprises one or more signatures for detecting malware when the malware is in the format used by the application processing the content containing the malware on an endpoint.

19. The method of claim 1, wherein the traffic signature distinctly identifies characteristics of the content carried by network traffic, wherein the content carried by network traffic is in a format different from a format of the content processed by an application on an endpoint.

* * * * *